United States Patent Office 3,269,963
Patented August 30, 1966

3,269,963
SELF-EXTINGUISHING STYRENE
POLYMER COMPOSITIONS
Rudolf Ilgemann, Rolf Dieter Rauschenbach, and Guenter Foerster, Ludwigshafen (Rhine), Germany, assignors to Badische Anilin- & Soda-Fabrik Aktiengesellschaft, Ludwigshafen (Rhine), Germany
No Drawing. Filed Sept. 21, 1964, Ser. No. 398,066
Claims priority, application Germany, Sept. 25, 1963, B 73,644
7 Claims. (Cl. 260—2.5)

This invention relates to self-extinguishing plastics materials based on styrene polymers containing organic chlorine compounds as flame retarding agents.

It is known that styrene polymers which contain an organic difficultly volatile chlorine compound as a flame retarding or flameproofing agent are flame retardant or self-extinguishing. The styrene polymers are however only flame retardant to an adequate extent if they contain the flameproofing agent in such amounts that the chlorine content is at least 20% by weight. It has been found however that such high contents of flameproofing agent markedly affect the physical properties and particularly the mechanical properties of the styrene polymers.

It is also known that the flameproofing effect of organic chlorine compounds can be improved by adding antimony trioxide so that smaller amounts of chlorine-containing flameproofing agents are required. It is however disadvantageous that relatively large amounts of antimony trioxide have to be used so that again the properties of the styrene polymers which have been flameproofed are impaired.

Plastics compositions have also been proposed for the production of self-extinguishing moldings which contain, in addition to styrene polymers, organic chlorine compounds, small amounts of certain organometallic compounds such as ferrocene, the corresponding cobalt or manganese compounds or iron, cobalt or molybdenum carbonyl. The organometallic compounds have a synergistic effect on the organic chlorine compounds so that considerably smaller amounts of chlorine compounds are required to make the styrene polymers self-extinguishing.

We have now found that plastics compositions for the preparation of moldings have particularly favorable properties if they contain at least one styrene polymer, at least one difficultly volatile organic chlorine compound in such an amount that the chlorine content of the composition is from 2 to 15% by weight, 0.05 to 5% by weight, with reference to the composition, of at least one organometallic compound having the general formula MeAr₂ in which Me denotes a transition metal of groups VI–B, VII–B or VIII of the Periodic System (Handbook of Chemistry and Physics, 40th Edition, pages 448 and 449, Chemical Rubber Publishing Co., Cleveland, Ohio, U.S.A.) and Ar denotes an aromatic system, and 0.01 to 3% by weight of at least one organic phosphine oxide.

Styrene polymers within the scope of the present invention include polystyrene and copolymers of styrene and other monomeric polymerizable compounds which contain at least 50% by weight of styrene base units. Examples of suitable comonomers are α-methylstyrene, nuclear halogenated styrenes, such as 2,4-dichlorostyrene, acrylonitrile, methacrylonitrile, esters of α, β-unsaturated carboxylic acids with alcohols containing one to eight carbon atoms, such as esters of acrylic acid, methacrylic acid and fumaric acid with alcohols having one to eight carbon atoms, N-vinyl compounds, such as N-vinylcarbazole, butadiene and small amounts of divinylbenzene.

Suitable difficulty volatile organic chlorine compounds are those which contain at least four carbon atoms and whose chlorine content is between 40 and 75% by weight, such as low molecular weight chlorine compounds, for example hexachlorocyclododecane, hexachlorocyclopentadiene, hexachloroendomethylenetetrahydrophthalic acid, tetrachlorobutyrolactone and tetrachlorobutanediol diacetate. High molecular weight compounds containing chlorine which have little or no effect on the properties of the styrene polymers are particularly suitable. Examples of such compounds are afterchlorinated polyvinyl chloride having a chlorine content of about 58 to 63% by weight and chlorinated polyisobutylene having a chlorine content of about 40 to 50% by weight. Chlorinated paraffins having a chlorine content of 60 to 75% by weight whose carbon chains contain at least eighteen to forty carbon atoms are also particularly suitable. It is expedient to use compounds having a high chlorine content so as to be able to keep the amount used in the compositions low. The chlorine compounds are added to the compositions in amounts such that they have a chlorine content of at least 2% by weight. In most cases it is not necessary for the compositions to contain more than 15% by weight of chlorine. The compositions advantageously contain from 3 to 6% by weight of chlorine.

Transition metals of groups VI–B, VII–B and VIII of the Periodic System include chromium, manganese, iron, cobalt, nickel, molybdenum, technetium, ruthenium, rhodium, tungsten, rhenium, osmium, iridium and platinum. The complex compounds of chromium, manganese, iron, cobalt, nickel and molybdenum are particularly suitable.

By an aromatic system we mean substituted or unsubstituted cyclopentadienyl or benzene. These compounds have the general formula:

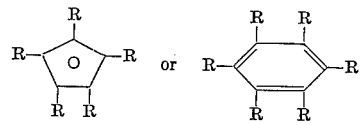

in which R denotes a hydrogen atom, an alkyl group, an alkoxy group, an aryl group, an acrylic group or a halogen atom.

Examples of suitable compounds are dicyclopentadienyl cobalt, dicyclopentadienyl nickel and dicyclopentadienyl iron, acetyldicyclopentadienyl complexes of the said metals, and also dibenzene chromium or cinnamoylferrocene. The complex compound dicyclopentadienyl iron (ferrocene) is particularly suitable.

The complex compounds are contained in the plastics compositions in amounts of 0.05 to 5% by weight, preferably 0.1 to 0.4% by weight, with reference to the total composition.

The organic phosphine oxides which are contained in the compositions according to this invention have the general formula:

in which R denotes identical or different saturated or unsaturated aliphatic, cycloaliphatic, aromatic or heterocyclic radicals. The radicals may also be substituted. Phosphine oxides having radicals R which contain from 4 to 9 carbon atoms, inclusive, are particularly advantageous.

The compositions advantageously contain 0.01 to 3% by weight, preferably 0.05 to 0.5% by weight, with reference to the compositions, of one or more phosphine oxides.

Examples of suitable phosphine oxides are: triphenyl phosphine oxide, tritoluyl phosphine oxide, tributyl phosphine oxide, butenyl dibutyl phosphine oxide, tri-o-chlorophenyl phosphine oxide and tri-gamma-pyridyl phosphine oxide.

The compositions may be processed into self-extinguishing moldings or sections for example by injection moldings or extrusion. Dissolved in organic solvents, they are also suitable as self-extinguishing lacquers, for example for coating wood or metals. Owing to the relatively small content of organic halogen compounds, the molding materials according to this invention have softening points which differ only unimportantly from those of the polymers contained therein.

Plastics compositions which are suitable for the production of self-extinguishing expanded articles, have particular importance. These contain a blowing or expanding agent as well as a styrene polymer, an organic chlorine compound, an organometallic compound and an organic phosphine oxide.

Expanding agents include particularly aliphatic saturated hydrocarbons or perchlorofluorocarbons which are gaseous or liquid under normal conditions, whose boiling point is lower than 95° C. at 760 mm. absolute pressure and which do not dissolve the styrene polymer. Examples of suitable expanding agents are: propane, butane, pentane, hexane, cyclohexane, difluorodichloromethane and trifluorochloromethane. Compounds which decompose at elevated temperature to form gaseous substances are also suitable as expanding agents. Examples of these expanding agents are azodiisobutyronitrile, benzenesulfhydrazide and inorganic substances, as for example sodium bicarbonate.

The expanding agent may be contained in the expandable compositions in amounts of 2 to 20% by weight with reference to the amount of styrene polymer contained in the composition. From these expandable compositions, self-extinguishing expanded articles are obtained when fine particles of these materials are heated in gas permeable molds to temperatures above the softening point of the polymer contained in the materials so that the particles expand and fuse together. Expandable plastics materials of the said kind may also be processed by means of extruders into foam sheeting.

Other components, for example fillers, dye pigments, lubricants, antistatics and plasticizers, may also be contained in the compositions.

For the preparation of the compositions, the organic chlorine compound, together with the organometallic compound and the phosphine oxide and any other additives, may be incorporated in the plastics on rollers, in extruders or in kneaders. Flame-proofing agent, organometallic compound and phosphine oxide may in many cases be added to the monomers prior to polymerization so that compositions according to this invention are obtained by polymerization of the monomers. Cast sheeting may be obtained for example by pouring out a solution of the plastics which contains the organic phosphine oxide, the organometallic compound and the chlorine compound, and removing the solvent.

Self-extinguishing and expandable particular materials containing an expanding agent are most advantageously prepared by polymerization in aqueous suspension of monomers which contain in admixture an expanding agent, a chlorine compound, an organometallic compound and an organic phosphine oxide.

The self-extinguishing characteristics are tested on moldings prepared from the compositions in the following way:

Unfoamed plastics materials in the form of pieces having the dimensions 0.1 x 3 x 12 cm. and foamed plastics materials in the form of pieces having the dimensions 3 x 3 x 12 cm. are held for five seconds in the non-luminous flame of a Bunsen burner and then removed from the flame with a gentle movement. The period after removal from the flame before the molding is extinguished (the extinction period) is a measure of the flame retardance. An extinction period of 0 to 2 seconds may be regarded as very good, a period of 2 to 5 seconds as good. Extinction periods of less than ten seconds are adequate. Molding materials which have not been adequately flameproofed burn away completely after having been removed from the flame.

Compositions according to this invention may contain considerably smaller amounts of synergistic organometallic compounds in order to be adequately self-extinguishing. This is an advantage because the organometallic compounds usually have slight color so that the compositions according to this invention are colored to a lesser extent than the prior art materials. Organometallic compounds may also disturb the course of the polymerization, so that this disturbing effect occurs to a much lesser extent in the production of the compositions according to this invention.

The following examples will further illustrate this invention. The parts specified in the examples are parts by weight. The K-values are determined by the method of H. Fikentscher, Cellulosechemie, 13 (1932), 60.

*Example 1*

18.5 parts of polystyreene, 3 parts of pentane, 1.5 parts of chloroparaffin having 70% of chlorine, 0.02 part of ferrocene and 0.02 part of triphenyl phosphine oxide are dissolved in 80 parts of methylene chloride. Cast sheeting is prepared from the solution. Sheeting obtained after the solvent has evaporated are foamed in boiling water.

The sheeting is self-extinguished in less than two seconds after removal from the extraneous flame. Similar sheeting without triphenyl phosphine oxide or ferrocene burns away.

*Example 2*

Cast sheeting is prepared as described in Example 1 from 18.5 parts of polystyrene, 3 parts of n-pentane, 1.8 parts of a chloroparaffin mixture of chlorinated paraffins having an average of eighteen to forty carbon atoms and 65% by weight of chlorine, and 0.02 part of a phosphine oxide (as set out in the following table). The self-extinguishing characteristics are determined by the method described above. The results are collated in Table 1:

| Phosphine oxide: | Extinction period of the sheeting in seconds |
|---|---|
| Tritoluyl phosphine oxide | 2 |
| Tributyl phosphine oxide | 2 to 3 |
| Phenyl dibutyl phosphine oxide | 2 |
| Tri-p-chlorophenyl phosphine oxide | 2 to 3 |
| Tri-gamma-pyridyl phosphine oxide | 2 to 3 |

*Exdmple 3*

Finely particles injection molding material is prepared by means of an extruder from mixtures containing the following components:

(a) 90 parts of a copolymer of 72 parts of styrene and 28 parts of acrylonitrile, 10 parts of a chlorinated polyisobutylene having 45% of chlorine, 0.3 part of ferrocene and 0.2 part of triphenyl phosphine oxide;

(b) 90 parts of a copolymer of 72 parts of styrene and 28 parts of acrylonitrile, 10 parts of a chlorinated polyethylene having 40% of chlorine, 0.3 part of ethylferrocene, and 0.2 part of triphenyl phosphine oxide;

(c) 92 parts of a graft polymer of 70 parts of styrene and 20 parts of acrylonitrile onto 10 parts of polybutadiene, 8 parts of an afterchlorinated polyvinyl chloride having 62% of chlorine, 0.3 part of cinnamoylferrocene and 0.2 part of triphenyl phosphine oxide.

The injection molding materials can be processed in the conventional way to moldings which when tested by the abovementioned method become extinguished within two to three seconds after removal from the extraneous flame.

Example 4

The substances specified below under (d) and (e) are mixed by means of an extruder and the mixtures are extruded at temperatures lying only a few degrees above the softening point of the mixtures through a nozzle direct into cold water so that expansion of the extruded strings is prevented. The strings are cooled and broken up. The expandable particles thus obtained may be processed into foam plastics by conventional methods, for example by heating in molds. The foam plastics cease to burn, when tested by the abovementioned method, within one to two seconds after removal from the flame.

(d) 100 parts of a copolymer of 95 parts of styrene and 5 parts of tertiary-butyl acrylate containing 5% of pentane homogeneously distributed therein, 12 parts of hexachlorocyclododecane, 0.25 part of dicyclopentadienyl cobalt, and 0.25 part of triphenyl phosphine oxide;

(e) 100 parts of a copolymer of 90 parts of styrene and 10 parts of 2,4-dichlorostyrene containing 6% of pentane homogeneously distributed therein, 12 parts of tetrachlorobutyrolactone, 0.20 part of dicyclopentadienyl nickel, and 0.25 part of triphenyl phosphine oxide.

Example 5

100 parts of a copolymer of 80 parts of styrene and 20 parts of α-methylstyrene, 10 parts of hexachloroendomethylenetetrahydrophthalic acid, 0.25 part of dibenzene chromium, and 0.15 part of triphenyl phosphine oxide are mixed in a double screw extruder. Such an amount of methylene chloride is forced into the homogeneous melt in the central portion of the extruder that the material contains 12 to 15% by weight of methylene chloride. The mixture expands upon leaving the nozzle; a string of foam plastics having a unit weight of 50 g./l. is obtained. The string ceases to burn within two to four seconds after removal from the extraneous flame.

Example 6

The mixtures used are:

(f) 96.5 parts of styrene, 3.5 parts of a chloroparaffin having 71% of chlorine, 0.2 part of an unsaturated polyester of phthalic acid, maleic acid and glycol, 0.3 part of dibenzoyl peroxide and 0.2 part of dicumyl peroxide;

(g) as under (f) but with the 0.2 part of polyester replaced by 0.01 part of divinylbenzene.

Mixtures prepared as under (f) and (g) are suspended in a solution of 0.2 part of sodium pyrophospate, and 0.3 part of polyvinylpyrrolidone (K-value 90) in 200 parts of water in an autoclave fitted with a stirrer. The mixture is stirred and kept at 80° C. for twenty hours and at 95° C. for fifteen hours. In each case, after nineteen hours, a mixture of 0.1 part of ferrocene, 0.1 part of triphenyl phosphine oxide and 8 parts of pentane is introduced.

Expandable particles are obtained which can be processed by conventional methods into moldings having foam structure. The moldings cease to burn within one to two seconds after removal from the flame when tested by the method described above.

We claim:

1. A self-extinguishing plastic composition comprising a styrene polymer, a difficultly volatile organic chlorine compound containing at least four carbon atoms and having a chlorine content of from 40 to 75% by weight in such an amount that the chlorine content of the composition is 2 to 15% by weight, 0.05 to 5% by weight, with reference to the composition, of an organometallic compound having the general formula $MeAr_2$ in which Me denotes a transition metal of groups VI–B, VII–B and VIII of the Periodic System and Ar denotes an aromatic system, and 0.01 to 3% by weight, with reference to the composition, of at least one organic phosphine oxide of the general formula

in which R denotes a radical containing from 4 to 9 carbon atoms selected from the group consisting of aliphatic, cycloaliphatic, aromatic and heterocyclic radicals.

2. A self-extinguishing plastic composition comprising a styrene polymer, a difficultly volatile organic chlorine compound containing at least four carbon atoms and having a chlorine content of from 40 to 75% by weight in such an amount that the chlorine content of the composition is 2 to 15% by weight, 0.05 to 5% by weight, with reference to the composition, of an organometallic compound having the general formula $MeAr_2$ in which Me denotes a transition metal of groups VI–B, VII–B and VIII of the Periodic System and Ar denotes an aromatic system, 0.01 to 3% by weight, with reference to the composition, of at least one organic phosphine oxide of the general formula

in which R denotes a radical containing from 4 to 9 carbon atoms selected from the group consisting of aliphatic, cycloaliphatic, aromatic and heterocyclic radicals, and 2 to 20% by weight, with reference to the styrene polymer contained in the plastic composition, of an expanding agent.

3. A self-extinguishing plastic composition as claimed in claim 1 wherein the organometallic compound is ferrocene.

4. A self-extinguishing plastic composition as claimed in claim 2 wherein the organometallic compound is ferrocene.

5. A self-extinguishing plastic composition as claimed in claim 1 wherein the phosphine oxide is a member selected from the group consisting of triphenyl phosphine oxide, tritoluyl phosphine oxide, tributyl phosphine oxide, butenyl dibutyl phosphine oxide, tri-o-chlorophenyl phosphine oxide and tri-gamma-pyridyl phosphine oxide.

6. A self-extinguishing plastic composition as claimed in claim 2 wherein the phosphine oxide is a member selected from the group consisting of triphenyl phosphine oxide, tritoluyl phosphine oxide, tributyl phosphine oxide, butenyl dibutyl phosphine oxide, tri-o-chlorophenyl phosphine oxide, and tri-gamma-pyridyl phosphine oxide.

7. A self-extinguishing plastic composition as claimed in claim 2 wherein the expanding agent is a member selected from the group consisting of aliphatic saturated hydrocarbons and perchlorofluorocarbons whose boiling point is lower than 95° C. at 760 mm. absolute pressure and which does not dissolve the styrene polymer.

References Cited by the Examiner

UNITED STATES PATENTS

| | | | |
|---|---|---|---|
| 2,837,494 | 6/1958 | Gilbert et al. | 260—45.7 |
| 2,894,918 | 6/1959 | Killoran et al. | 260—2.5 |
| 2,979,482 | 4/1961 | Piccoli | 260—2.5 |

MURRAY TILLMAN, *Primary Examiner.*

M. FOELAK, *Assistant Examiner.*